United States Patent Office 2,735,863
Patented Feb. 21, 1956

2,735,863

METHOD OF PREPARING 2-HYDROXY-METHYL-3-BUTENONITRILE AND THE DIMER OF 2-CYANOPRENE

Charles C. Price, South Bend, Ind., assignor to The General Tire and Rubber Company, Akron, Ohio, a corporation of Ohio No Drawing. Application October 2, 1952,
Serial No. 312,860

5 Claims. (Cl. 260—464)

This invention relates to a method of making intermediate compounds which may be readily converted to 2-cyanobutadiene. It particularly relates to the preparation of such intermediates from readily available materials such as allyl cyanide and formaldehyde.

Allyl cyanide and formaldehyde or a formaldehyde producing material such as paraformaldehyde may be refluxed for many hours at atmospheric pressure without any noticeable reaction occurring. When, however, a Friedel-Crafts catalyst such as stannic chloride is incorporated, a violent reaction frequently occurs even though hydrocarbon diluents and external cooling are used. The product obtained is primarily an unusable tar.

It is an object of the present invention to provide a method of producing a desirable product by reacting an allyl cyanide (including alkyl substituted allyl cyanides) with formaldehyde without encountering dangerous and violent reaction conditions.

It is another object of the invention to provide intermediates which can be readily converted to 2-cyanoprene and to provide a controllable process for making such intermediates.

It is a further object of the present invention to provide 2-hydroxymethyl-3-butenonitrile which can be readily dehydrated to 2-cyanoprene.

Another object of the present invention is to provide a method of making a mixture of a 2-hydroxymethyl-3-butenonitrile with a dimer of a 2-cyanobutadiene.

Other objects will become apparent from the following detailed description of the invention.

I have found that when allyl cyanide and formaldehyde or a formaldehyde-producing substance is heated for a suitable time at elevated temperatures above their normal boiling point, at super-atmospheric pressure, that a reaction occurs in which a 2-hydroxymethyl butenonitrile and a dimer of a 2-cyanobutadiene is produced even though no Friedel-Crafts catalyst be present. In the absence of appreciable or effective amounts of Friedel-Crafts catalyst, the reaction is controllable and is not violent even though the temperature is substantially elevated. The reaction speed, of course, depends upon the temperature of the reacting mass and the speed becomes appreciable around 100° C. to 120° C. When the temperature is much greater than 200° C., the reaction may occur so rapidly that some degree of violence may be expected. In practice, it is therefore usually undesirable for the reacting temperature to be much above 170° C. and is generally preferable to utilize temperatures of between 130 to 170° C. The pressure need only be sufficiently above atmospheric pressure to maintain the temperature desired in the liquid reacting mass. Pressures may therefore vary from the immediate vicinity of or slightly less than the vapor pressure of the reacting materials (the point where vigorous boiling occurs) to any desired higher pressure. Generally, pressures of 1 to 15 or 20 atmospheres are preferred, the maximum pressures being dictated solely by the design considerations of the apparatus involved.

Since in the reaction of formaldehyde and the allyl cyanide, one mole of allyl cyanide reacts with one mole of formaldehyde, the ingredients are usually incorporated into the pressure chamber in substantially equal molar amounts. However, any excess of either material may be usually recovered at the end of the reaction so that the quantities of the two ingredients added to the reactor are not critical. One may use, therefore, mixtures having the reactants varying in the proportions of 1 to 5 to 5 to 1 if desired.

The time during which the ingredients are maintained at elevated temperature has considerable to do with the proportions of the various ingredients in the final product. When the reaction mixture is maintained at elevated temperatures for longer times or when the reaction mixture is maintained at a higher temperature for the same time, there is first a greater tendency for formation of increased amounts of the dimer of the 2-cyanoprene and smaller amounts of the hydroxy material. Then with further increased heating time more of a polymeric or resinous material, which is believed to be a product of the 2-cyanoprene, may form. Therefore, if the 2-hydroxymethyl-3-butenonitrile is desirable in larger proportions, the product of time and temperature should be reduced as much as possible consistent with the total yield desired. By varying the time at which the reaction mixture is held at a given reacting temperature, substantial variation in the proportions of the end products is obtained.

In order that the reaction may occur in substantial yields, the ingredients should be maintained in a thoroughly mixed state. When the reaction mixture is maintained without agitation as in an unrocked bomb, the contact of the ingredients is apparently reduced by settling of those of higher density. It is, therefore, highly desirable if good yields are to be obtained to provide agitation during a substantial portion of the reaction time either by direct stirring or by rocking of the pressure container containing the reactive ingredients or by other suitable agitation means.

Any allyl cyanide within the following general formula may be used:

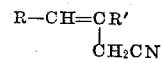

where R is selected from hydrogen and hydrocarbon groups selected from alkyl groups having up to and including 4 carbon atoms and aryl groups and R' is selected from the group consisting of hydrogen, methyl, ethyl and phenyl. When 2-cyanoprene or intermediates suitable for its production are desired, R and R' are, of course, hydrogen and unsaturated cyanide is an unsubstituted allyl cyanide, which may be prepared by reacting allyl chloride with a metal cyanide such as cupric cyanide. However, other compounds such as methallyl cyanide (3-methylbutenyl-3-nitrile or metamethyl allylcyanide) gamma methylallylcyanide, gamma ethylallylcyanide, beta phenylallylcyanide, and gamma phenylallylcyanide, may also be used to obtain desirable products in accordance with our process.

Formaldehyde is preferably used in commercial practice although any of the formaldehyde donors such for example as paraformaldehyde and others known in the art are preferably used in laboratory procedures.

The evidence indicates that general reaction proceeds as follows:

1.

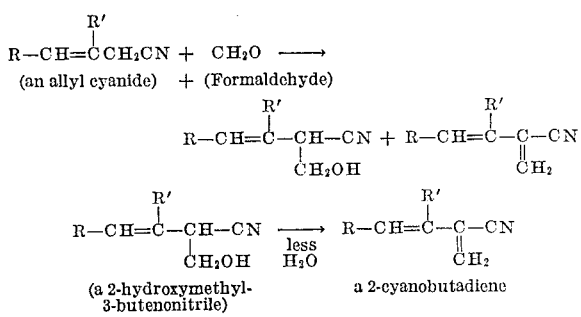

(a 2-hydroxymethyl-3-butenonitrile) → a 2-cyanobutadiene

2.

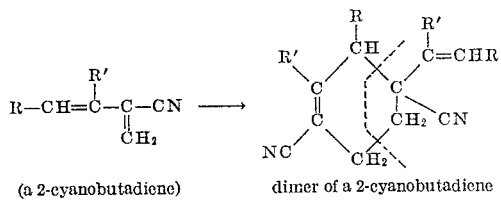

(a 2-cyanobutadiene)   dimer of a 2-cyanobutadiene

The primary condensation occurs not at the double bond but at the active methylene group to yield 2-hydroxymethyl-3-butenonitrile when allyl nitrile is a reacting ingredient. The initial product formed is the 2-hydroxymethyl-3-butenonitrile which partially dehydrates during the reaction to produce the 2-cyanobutadiene. The latter material may react with itself to form the dimer of 2-cyanobutadiene.

As before noted, when the time at a given reaction temperature is increased or when the temperature is increased without sufficiently decreasing the time, the quantity of dimer is increased above the minimum obtainable. It is generally desirable to utilize reaction times of only a few hours, say ½ to 30 hours, although at the higher elevated temperatures substantial reaction may occur in considerably less than ½ hour. The product obtained after the reaction generally contains some effervescing unreacted formaldehyde as well as some tarry material. The reaction mixture may be purified and separated from its component by distillation and crystallization procedures. When distilled, one obtains besides water an unreacted parallyl cyanide and paraformaldehyde or formaldehyde, two main fractions having substantial differences in their boiling points. The lower boiling material is largely the 2-hydroxymethyl-3-butenonitrile and the higher boiling point material is largely the dimer of 2-cyanoprene. Any tarry or polymeric residue that may be formed remains in the still bottom.

The following examples illustrate the invention:

*Example 1*

A stainless steel bomb was filled with equal molar quantities of allylcyanide and paraformaldehyde, comprising 268 g. of allyl cyanide and 120 g. of paraformaldehyde. This was maintained at 150° C.±2° C. by electrically heated automatic control. A four hour run was made. The bomb was rocked throughout the reaction. The product from these reactions was a heavy, yellow, homogeneous liquid effervescing unreacted formaldehyde. Vacuum distillation of this liquid gave water, unreacted allyl cyanide and paraformaldehyde, some resinous material, and the main product consisting of two fractions.

One of the fractions from the four-hour reaction was a 2-hydroxymethyl-3-butenonitrile and the other higher boiling fraction was the dimer of 2-cyano-1,3 butadiene. The yield based on consumed (unrecovered) allyl cyanide used was 27.8% of 2-hydroxymethyl-3-butenonitrile and 53.7% of the dimer of 2-cyano-1,3-butadiene. Another 18.5% of tarry material remained after the distillation.

A second run of 201 g. (3 moles) of allyl cyanide and 75 g. (2.5 moles) of paraformaldehyde was made for thirty hours under similar conditions. The yield of 2-hydroxymethyl-3-butenonitrile from this thirty-hour reaction was found to be 15%, whereas the yield of the dimer was 44.5% and the yield of resinous material was 40%.

An attached gauge indicated that the pressure was 95 pounds per square inch at 150° C. 61.5% of allyl cyanide charged was converted into product in the four-hour reaction and 83.9% of allyl cyanide charged was converted into product in the thirty-hour reaction. The two reactions illustrate the effect of increasing the product of reaction time times reaction temperature.

The dimer was a solid with a sharp melting point of 54.5° C. and a boiling point of 144–144° C./2 mm. The compound was soluble in absolute ethanol, benzene, dioxane, ether, and acetone and insoluble in water and petroleum ether. In acetone solution it rapidly decolorized a dilute solution of potassium permanganate. The index of refraction at 25° C. and based on the sodium D line ($N_D^{25}$) was 1.5012, and the molecular weight (cryoscopic in benzene) as measured was 154 compared to a calculated value of 158.2.

The 2-hydroxymethyl-3-butenonitrile was a clear colorless liquid with almost no odor and was soluble in water, absolute methanol, chloroform, benzene, and ether and insoluble in petroleum ether and carbon tetrachloride. It gave a positive reaction when treated with ceric nitrate reagent and was found to decolorize dilute potassium permanganate solution and bromine in carbon tetrachloride. Characteristics were $N_D^{25}$ 1.4642, $D_4^{25}$ 1.008.

*Example 2*

A run of 3 moles of methallylcyanide and 3 moles of paraformaldehyde was made at 170° C. in a closed vessel for a period of four hours. The vessel was strongly rocked during this period to maintain the reactants in an agitated state. The procedure was substantially the same as in Example 1. The main products were distilled as in Example 1 and were found to be 2-hydroxymethyl-3-methyl-3-butenonitrile

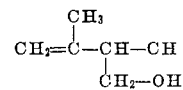

and the dimer of 2-methyl-3-cyano butadiene-1,3.

In the preceding examples, the paraformaldehyde may be substituted in whole or in part by formaldehyde or any material providing formaldehyde at reaction temperatures in the substantial absence of other materials which react with allyl cyanide. The allyl cyanide and methallyl cyanide may be substituted in whole or in part by equal molar amounts of any one or more of the substituted allyl cyanides above mentioned.

Experiments attempted in the same way as above indicated that no appreciable reaction occurred between crotononitrile and formaldehyde under conditions where considerable conversion occurred for allyl cyanide. This rules out as a possible mechanism the isomerization of allyl cyanide to crotononitrile followed by Prins-type condensation at the double bond of the latter. In the claims formaldehyde is used in the generic sense to include materials which produce formaldehyde in the reaction mass.

It is apparent that in accordance with the provisions of the patent statutes modifications of the invention may be made without changing the spirit thereof. Having thus described my invention, what I claim is:

1. A method of preparing 2-hydroxymethyl-3-butenonitrile and the dimer of 2-cyanobutadiene, comprising the steps of heating under non-catalytic conditions a mixture of allyl cyanide and formaldehyde at a temperature of between 120° C. and 200° C. and under super-atmospheric pressure of at least one atmosphere, maintaining the temperature of said mixture above 120° C. for a sufficient time to procure a reaction between the ingredients of said mixture.

2. The method of claim 1 in which the vessel is agitated throughout the reaction.

3. The method of claim 1 in which substantially equal molar quantities of allyl cyanide and paraformaldehyde are employed in said mixture and the pressure is 1 to 20 atmospheres.

4. The process which comprises mixing with formaldehyde a cyanide of the general formula

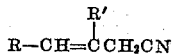

$$R-CH=\overset{R'}{\underset{|}{C}}CH_2CN$$

where R is a member of the group consisting of hydrogen, alkyl groups of less than 5 carbon atoms, and aryl groups, and where R' is a member of the group consisting of hydrogen, methyl, ethyl and phenyl groups, heating the mixture under non-catalytic conditions and at a pressure sufficient to maintain the temperature of the mass between 120° C. and 200° C. until a substantial portion of said mixture reacts and separating unreacted materials from the 2-hydroxymethyl-3-butenonitrile and the dimer of 2-cyanobutadiene product.

5. The method of claim 4 wherein the mixture is heated between 130° C. and 170° C.

References Cited in the file of this patent

UNITED STATES PATENTS

| 2,384,268 | Arundale | Sept. 4, 1945 |
| 2,386,586 | Brant et al. | Oct. 9, 1945 |

FOREIGN PATENTS

| 619,577 | Great Britain | Mar. 11, 1949 |

OTHER REFERENCES

Price et al.: J. Am. Chem. Soc., vol. 72, pp. 5334–5 (1950).

Magat et al.: J. Am. Chem. Soc., vol. 73, pp. 1028–3 (1951).